Nov. 5, 1968  C. B. GENTRY  3,409,217
BILLET HEATING AND CONTROL THEREFOR
Filed Nov. 29, 1967  2 Sheets-Sheet 1

INVENTOR.
CHARLES B. GENTRY
BY
ATTORNEYS

Nov. 5, 1968    C. B. GENTRY    3,409,217
BILLET HEATING AND CONTROL THEREFOR
Filed Nov. 29, 1967    2 Sheets-Sheet 2

INVENTOR.
CHARLES B. GENTRY
BY
ATTORNEYS

United States Patent Office 3,409,217
Patented Nov. 5, 1968

3,409,217
BILLET HEATING AND CONTROL THEREFOR
Charles B. Gentry, Grand Rapids, Mich., assignor to Granco Equipment, Inc., Grand Rapids, Mich., a corporation of Delaware
Filed Nov. 29, 1967, Ser. No. 686,648
10 Claims. (Cl. 236—15)

ABSTRACT OF THE DISCLOSURE

This disclosure relates to a billet heating system in which a plurality of billets are passed through a heat treating furnace wherein they are heated by impingement of a flame on the billets. The billets are supported in the furnace by rollers positioned in a U-shaped track. Temperature sensing elements such as thermocouples are positioned in the furnace floor and extend through the bottom of the U-shaped track and contact the billets. The upstanding flanges of the track provide a shield for the temperature sensing elements. The amount of heat supplied to the billets can be regulated in accordance with the sensed temperature of the billets.

The temperature sensing elements can be reciprocated to permit the billets to move to different zones in the furnace. The means for reciprocating the temperature sensing elements is itself removable from the temperature sensing elements to allow the same to be replaced from time to time. Air can also be supplied to the space surrounding the temperature sensing elements to prevent overheating of the elements.

---

This invention relates to a billet heating and a control system therefor. In one of its aspects it relates to a method for sensing the temperature of metal or metal-like material in billet form within a heating furnace comprising feeding the billets intermittently to the heating furnace, heating the billets by direct flame impingement from opposite sides of the furnace, projecting temperature sensing elements through the bottom of the furnace, shielding the temperature sensing elements with billet supporting members within the furnace, contacting the billets with the heat sensing elements while the billets are stationary within the furnace, and producing a signal representative of the temperature of the billets.

In another of its aspects the invention relates to a method for sensing the temperature of metal billets within a heating furnace as has been hereinbefore described wherein the signal generated is employed in controlling the amount of heat supplied to the furnace.

In another of its aspects the invention relates to an apparatus for heating metal or metal-like material in billet form comprising a furnace chamber, means for supporting billets within the furnace chamber, heating means spaced along the sides of the furnace chamber to heat the billets as they pass through the furnace, shielding means extending along at least a portion of the bottom of the furnace chamber, and temperature sensing means extending up from the bottom of the furnace between the shielding means adapted to contact the billets when the billets are stationary within the furnace.

Billet heating furnaces are well known. A commercially available billet heating system has been provided wherein billets are passed through a furnace on a conveyor which moves along the bottom portion of the furnace. The billets are heated by a plurality of flames which emanate from burners spaced along the path. The flame impinges directly on the billets.

In order to measure the temperature of the billets as they pass through the furnace, it has been found that a thermocouple probe which pierces the outer skin of the billets can be employed. In the past, the thermocouple probe has been mounted on a reciprocable trolley which moves the probe into and out of contact with the billets as they are heated. Although the thermocouple probes are shielded, it is necessary to withdraw the probes for about 30 seconds out of every minute in order to prevent the probes from overheating. Conventionally, the probes were moved in and out of the furnace chamber from the sides and adjacent the flames. This proximity of the probes to the flame caused the probes to heat up and register inaccurate readings as well as deteriorate the thermocouple electrodes. Due to a delay time required to heat the thermocouples into the temperature range of the billets, in the conventional system, the thermocouples can only measure the temperature of the billets for no more than 25 perecnt of the time in which the billets are heating.

The thermocouples are preferably used to control the amount of heat supplied to the billets. Thus, the limited amount of time in which the thermocouples are in contact with the billets consequently limits the percentage of time in which the billet temperature can be controlled.

I have now discovered a heating system and method wherein the billets are effectively measured at 100 percent of the time in which they are stationary in the furnace and in which system the heat supplied to the furnace sections can be effectively controlled 100 percent of the time by providing a temperature sensing element which is positioned in the bottom of the furnace and is shielded from direct flame by a billet supporting member.

By various aspects of this invention one or more of the following, or other, objects can be obtained.

It is an object of this invention to provide an improved temperature sensing system for metal billets which are heated in a furnace.

It is a further object of this invention to provide an improved control system for regulating the heat supplied to billets made of metal or like material in a heat treating furnace.

It is a further object of this invention to provide a method for sensing the temperature of billets made of metal or like material which billets pass through a flame impingement heat treating furnace wherein the temperature can be sensed during substantially the entire time in which the billets are within the furnace.

It is still a further object of this invention to provide an improved system for sensing the temperature of heated billets within a furnace wherein the temperature sensing elements can be quickly removed and replaced.

It is a further object of this invention to provide a system for sensing metal billets with a thermocouple probe wherein different size billets can be sensed without adjustment of the thermocouple probe.

Other aspects, objects, and the several advantages of this invention are apparent to one skilled in the art from a study of this disclosure, the drawings, and the appended claims.

According to the invention, billets made of metal or metal-like material are passed intermittently through a furnace. The billets are supported within the furnace and are subjected to a direct flame impingement. The billet supports provide shielding means which extend along at least a portion of the bottom surface of the furnace adjacent and below the billets. A temperature sensing means extends up from the bottom of the furnace between the shielding means and contacts the billets to obtain a true reading of the billet temperature. The temperature sensing means are shielded from direct heat contact by the shielding means.

With this system, the temperature sensing elements can remain in contact with the billets during the entire time in which they are stationary within the furnace. Means are provided for resiliently urging the temperature sensing means against the billets. This urging means withdraws the temperature sensing elements from contact with the billet when the billets are moved further into the furnace. Further, the urging means is quickly released for a rapid interchange of the temperature sensing elements.

The invention will now be described with reference to the accompanying drawings in which.

Figure 1:
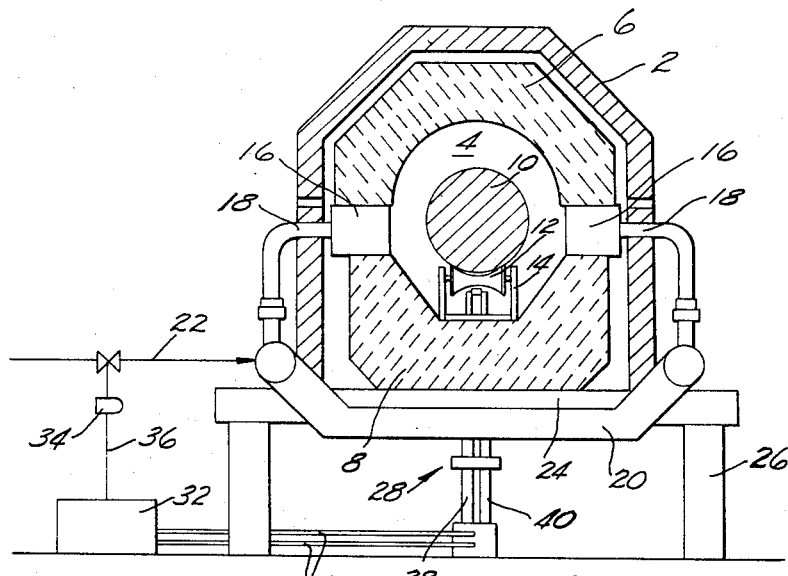
FIG. 1 is an end sectional view of a heat treating furnace according to the invention.
Figure 2:
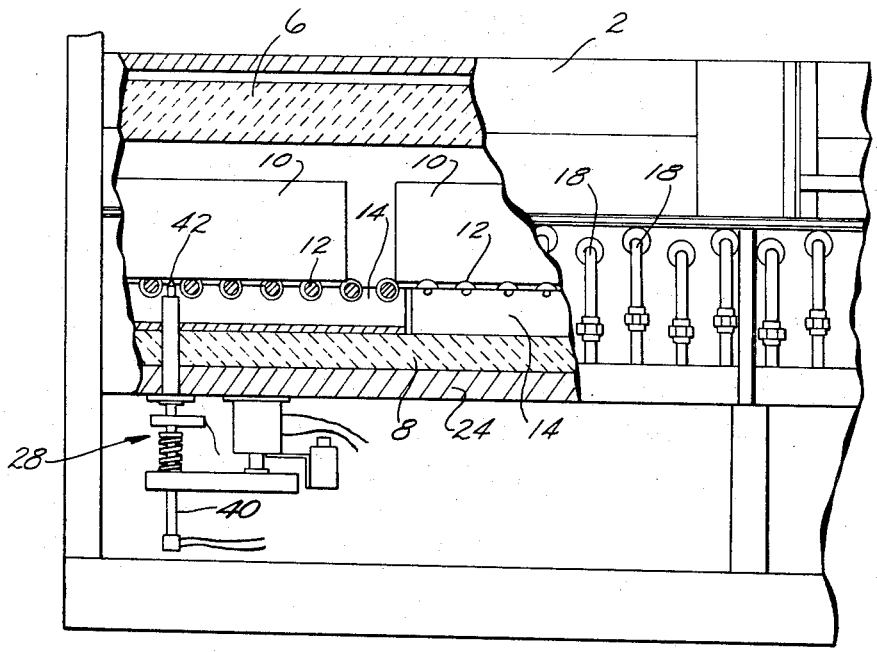
FIG. 2 is a side view partly in section of the furnace shown in FIG. 1.

Referring now to the drawings, there is shown a heat treating furnace having a housing 2 and an interior heat treating chamber 4 defined by the refractory material 6 and 8. Billets 10 are supported in chamber 4 on rollers 12 which are journalled in the upstanding flanges of a U-shaped channel 14. The U-shaped channel 14 is supported by a bottom refractory material 8.

The furnace is generally supported by a bottom plate 24 and upstanding support legs 26.

The billets are heated by direct flame impingement produced by fuel sprayed from nozzles 18 through aperture 16. The fuel can be liquid or gas and is supplied through a common header 20 from pipe 22.

A temperature sensing means generally designated as 28 is positioned below the furnace and comprises a pair of thermoucouple rods 38 and 40 which extend up through the bottom of the furnace, through the bottom portion of U-shaped channel 14, and contact the bottom surface of billet 10. The thermocouple rods can be any suitable thermocouple metals such as the well known Chromel-Alumel type. Obviously, the thermocouple must be selected according to the temperature of the furnace chamber 4. The thermocouple rods 38 and 40 are not normally interconnected. The rods are pointed at the end 42 and penetrate the outer layer of the billet. In this manner, a circuit is made between the rods with the billets serving as the connecting link.

The connection of the rods 38 and 40 will establish a potential between rods 38 and 40 at a given temperature. The potential causes current to flow between rods 38 and 40. The signal generated by the temperature within the furnace is passed through leads 30 to controller 32. The controller 32 converts the signal into a visual indication of the temperature of the billets and/or can be used to control the amount of heat supplied to that particular portion of the furnace. Preferably, the controller 32 controls the amount of fuel passing through line 22 by adjusting a motor valve 34 responsive to the signal received from the thermocouples. The controller 32 will pass the signal through lead 36 to the motor 34.

The controller 32 can be any conventional means for comparing a signal with a set point, and responsive to the signal, producing a second signal, a control signal, which will adjust a motor valve such as with a servo motor. The control signal is passed through lead 36 to a motor valve 34.

Preferably there are a plurality of heating zones within the furnace, each one with one or more thermocouple sensing elements and control systems associated therewith. In this manner, the temperature in each chamber of the furnace is controlled by the system of the invention.

The thermocouple rods are in contact with the billets when they are stationary in the furnace. Periodically, billets are moved along the track within the furnace. During this period of time the thermocouple rods must be withdrawn from the contact with the billets.

Figure 3:
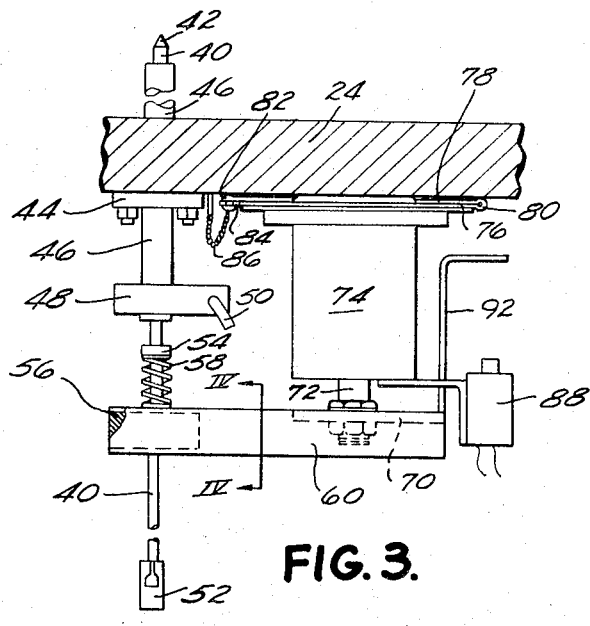
FIG. 3 is a side view of the actuating mechanism for the temperature sensing means.
Figure 4:
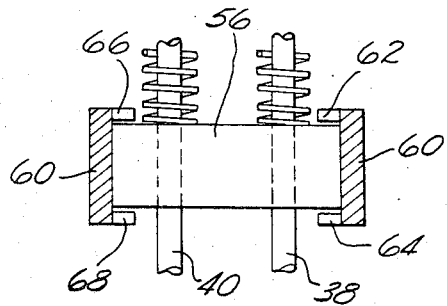
FIG. 4 is a sectional view along lines IV—IV of FIG. 3.

The apparatus for actuating the movement of the thermocouple rods is shown in detail in FIGS. 3 and 4. The thermocouple rods have a collar 54 rigidly attached thereto. The rods also have a slidably engaged therewith a fiber block 56 which is made of insulating material. A spring 58 is positioned between the collar 54 and the fiber block 56.

The rods are actuated by an air cylinder 74 having a reciprocatable piston rod 72 attached to horizontal arms 60 through plate 70. The horizontal arms 60 have inwardly directed flanges at 62, 64, 66, and 68 to slidably retain fiber block 56 (FIG. 4).

The air cylinder 74 is attached to a bottom hinge plate 76 which is pinned at 80 and 82. A removable pin 84 is provided to permit the hinge to rotate about point 80. The air cylinder is attached to bottom plate 24 through top hinge plate 78. A chain 86 is attached to pin 84 to prevent the loss of pin 84 when it is removed from socket 82.

A limit actuating flange 92 is attached to plate 70 and provides an electrical interlock with the billet pusher mechanism (not shown) when it contacts button 90 of limit switch 88. The electrical interlock will prevent the billet pusher mechanism from moving the billets through the furnace unless all thermocouple probes have been withdrawn from contact with the billets. This prevents the breaking of the ends of the thermocouple probes by moving of the billets with the probes in contact therewith.

When it is desirable to replace the thermocouple rods 40 and 38, pin 84 is removed to permit the air cylinder 74 to rotate about pin 80. As the cylinder is rotated, bars 60 are pulled to the right relative to the rods 38 and 40 as shown in FIG. 3 to permit the thermocouple rods to be free of the flange portions of the arm 60. After the air cylinder has rotated a sufficient amount, the thermocouple rods will be free and can be removed and then replaced with other rods having a collar 54, a spring 58, and fiber block 56. It can be seen that in this manner the replacement of thermocouple rods can be quite rapid. To make the operation faster, lead clips 52 be removably attached to the bottom of rods 38 and 40.

Figure 5:
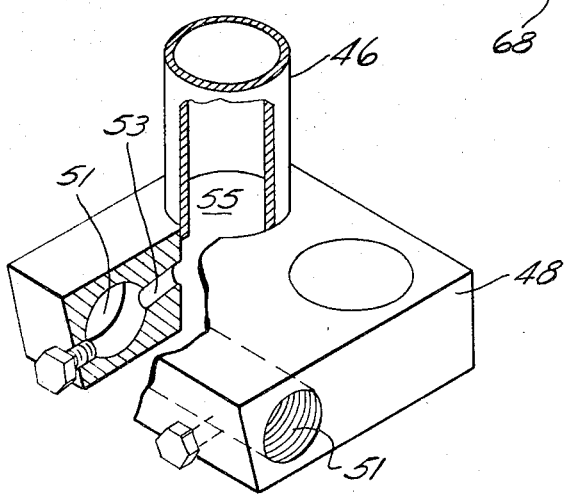
FIG. 5 is a perspective view of a cooling block employed in the invention.

At the upper portion, the thermocouple rods 38 and 40 are surrounded by cylindrical tubes 46 leaving an annular space between the rods and the tubes. The tubes are preferably made of stainless steel with procelain insulators on the inner portion thereof. The tubes 46 are attached to an air supply block 48 which supplies air to the annular portion between the rods and the tubes through an air hose 50. As seen more clearly in FIG. 5, the blocks have a longitudinal bore 51 and a lateral bore 53 to connect bore 51 with a bore 55. In this manner, air is continuously supplied through the space surrounding the thermocouple rods. This air passes all the way up to the top portion of the rods and thereby maintains a rod at suitable temperatures for the temperature sensing operation.

The furnace of the invention and the sensing system therefore can be employed in numerous heating operations. As an example, aluminum billets can be heated for extrusion operations using Chromel-Alumel thermocouple rods. Other metal billets such as copper and brass could also be heat treated according to the invention.

Whereas the invention has been described with reference to a sensing system in which a pair of thermocouple rods make contact with a metal billet to complete the circuit, the broader aspects of the invention include the use of other kinds of thermocouple arrangements. For example the ends of the probe can be connected together and the end of the probe can contact the billets without using the billet to complete the thermocouple circuit.

It can be appreciated from the foregoing description of the invention that the temperature sensing means and method provide a system whereby different size billets can be sensed without adjustment of the position of the sensing elements. Since the billets at the bottom (at rollers 12) will be positioned at approximately the same place regardless of the size, the temperature sensing elements, coming from the bottom of the furnace will not have to be adjusted. The springs 58 compensate the probes for what small differences in position of the billets occur with different size billets. On the other hand, the probes would require adjustment each time a different size billet was pushed through the furnace if the probes entered the furnace from the sides or top.

Reasonable variation and modification are possible within the scope of the foreging disclosure, the drawings, and the appended claims of the invention without departing from the spirit thereof.

We claim:

1. A method for sensing the temperature of a metal billet within a heating zone comprising:
   feeding the billets intermittently to said heating zone;
   supporting said billets within said heating zone through spaced upstanding flanges;
   heating said billets by direct flame impingement from opposite sides of the heating zone;
   projecting temperature sensing elements through the bottom of the heating zone between said flanges, whereby the temperature sensing elements will be protected from direct flame impingement by said flanges;
   contacting said billets with said heating and sensing elements while said billets are stationary within said heating zone, and
   generating a signal representative of the temperature of said billets in said heating zone.

2. An apparatus for heating metal billets comprising:
   a furnace chamber having an entrance and exit;
   heating means spaced along the sides of said furnace chamber to heat said billets;
   spaced supporting means for said billets extending along at least a portion of the bottom of said furnace chamber, said supporting means being below and adjacent said metal billets and so positioned to provide an area which is protected from direct heat from said heating means;
   temperature sensing means extending up from the bottom of said furnace between said spaced supporting means adapted to contact said billets when said billets are stationary within said furnace whereby said temperature sensing means are shielded from direct heat from said heating means.

3. An apparatus according to claim 2 wherein said supporting means comprises a U-shaped channel on the bottom of said furnace extending at least a portion of the length of said furnace between said entrance and said exit, a plurality of rollers are journalled within the upstanding flanges of said U-shaped channel to support said metal billets, and apertures are provided in the bottom of said channel to permit said temperature sensing means to pass therethrough.

4. An apparatus according to claim 2 wherein means are provided to cause reciprocation of said temperature sensing means into and out of contact with said billets.

5. An apparatus according to claim 4 wherein said reciprocation means comprises an air cylinder having a piston rod which is releasably attached to said temperature sensing means.

6. An apparatus for heating metal billets according to claim 2 wherein said temperature sensing means comprises a pair of electrodes which form a thermocouple when electrically connected at the ends thereof.

7. An apparatus for heating metal billets according to claim 6 wherein each of said electrodes has a collar attached thereto at a lower end thereof, an actuating block is slidably attached to said electrodes below said collar, a connector block slidably engages said actuating block, said connector block extending laterally of said actuating block and slidable in a lateral direction relative to said electrodes, an air operated cylinder is mounted beneath said furnace adjacent said electrodes through a hinge at one end and a holding pin at the other side so that an air operated cylinder is rotatable downwardly away from said rod when said pin is removed, a piston rod is reciprocatable by said air cylinder and attached to said connector block to raise and lower said actuating block when said piston rod is raised and lowered by said air cylinder, spring means are positioned between said collar and said actuating block to cause said electrodes to be raised and lowered as said piston rod is raised and lowered such that the electrodes can pierce the skin of said billets to complete a circuit between said electrodes.

8. An apparatus for heating metal billets according to claim 2 wherein said temperature sensing means is positioned within an annular tube which extends up through the bottom of the furnace chamber floor, and means are provided to supply cooling air to said annular tube.

9. An apparatus for heating metal billets according to claim 2 wherein there are a plurality of said temperature sensing means spaced axially along the path of travel of said billets within said furnace chamber.

10. An apparatus for heating metal billets according to claim 9 wherein each of said temperature sensing means is positioned in a furnace heating section which is independently fired, and means are provided in each heating section to control the heat in said section responsive to the temperature sensed by said temperature sensing means.

References Cited

UNITED STATES PATENTS

| 1,706,423 | 3/1929 | Truesdell | 236—15 X |
| 2,072,078 | 3/1937 | Bloomsburg et al. | 110—40 |
| 3,259,381 | 7/1966 | Walker | 263—6 |

ROBERT A. O'LEARY, *Primary Examiner.*

W. E. WAYNER, *Assistant Examiner.*